United States Patent
Anderson

[11] Patent Number: 4,553,012
[45] Date of Patent: Nov. 12, 1985

[54] ELECTRICAL DISCHARGE SURFACE CONDITIONING DEVICE

[76] Inventor: Alex L. Anderson, 3714 Fairway Pl., Rockford, Ill. 61107

[21] Appl. No.: 601,719

[22] Filed: Apr. 18, 1984

[51] Int. Cl.[4] .......................... B23P 1/08; B23P 1/12; B23P 1/20
[52] U.S. Cl. .................................. 219/69 R; 219/69 E
[58] Field of Search .................... 219/69 M, 69 R, 68, 219/69 E; 204/129.4, 129.46

[56] References Cited

U.S. PATENT DOCUMENTS

| | | | |
|---|---|---|---|
| Re. 28,027 | 6/1974 | Bills et al. ............................. | 82/57 |
| Re. 29,399 | 9/1977 | Inoue .................................... | 160/65 |
| 3,754,873 | 8/1973 | Bills et al. ............................. | 428/687 |
| 3,796,851 | 3/1974 | Pfaff, Jr. .............................. | 219/69 B |
| 3,800,117 | 3/1974 | Anderson ............................. | 222/245 |
| 3,840,718 | 10/1974 | Myers .................................. | 219/68 |
| 3,878,353 | 4/1975 | Anderson ............................. | 219/69 M |
| 3,890,481 | 6/1975 | Buck .................................... | 200/2 |
| 3,941,970 | 3/1976 | Grow .................................... | 219/69 R |
| 3,962,557 | 6/1976 | Buck .................................... | 219/69 D |
| 4,096,371 | 6/1978 | Lozon ................................... | 219/69 |
| 4,147,425 | 4/1979 | Friedman et al. ................... | 354/304 |
| 4,188,522 | 2/1980 | Baker ................................... | 219/69 |
| 4,203,018 | 5/1980 | Schneider ........................... | 219/69 C |
| 4,219,718 | 8/1980 | Sato et al. ........................... | 219/69 M |
| 4,221,952 | 9/1980 | Sato et al. ........................... | 219/69 G |
| 4,233,485 | 11/1980 | Sato et al. ........................... | 219/69 M |
| 4,242,557 | 12/1980 | Sato et al. ........................... | 219/69 E |
| 4,277,915 | 7/1981 | Hausermann et al. ............. | 51/57 |
| 4,287,403 | 9/1981 | Sato et al. ........................... | 219/69 M |
| 4,310,742 | 1/1982 | Pfau ..................................... | 219/69 M |
| 4,320,279 | 3/1982 | Bell, Jr. et al. ..................... | 219/69 P |
| 4,335,436 | 6/1982 | Inoue ................................... | 364/474 |
| 4,371,432 | 2/1983 | Kyuchukov ......................... | 204/129.35 |
| 4,448,656 | 5/1984 | Kuromatsu .......................... | 219/69 E |
| 4,471,199 | 9/1984 | Michishita et al. ................. | 219/69 E |
| 4,476,369 | 10/1984 | Inoue ................................... | 219/69 E |

Primary Examiner—M. H. Paschall
Attorney, Agent, or Firm—Allegretti, Newitt, Witcoff & McAndrews, Ltd.

[57] ABSTRACT

An electric discharge surface conditioning apparatus includes a discharge electrode comprised of an assembly of alternating conductive and non-conductive discs which rotate about an axis. The surface of the conductive discs includes a specific pattern of slots to effect a pumping action thereby enhancing the electric discharge efficiency by circulating the fluid away from the surface of the workpiece being machined. A control arrangement for controlling the orientation of the described electrode is provided.

8 Claims, 10 Drawing Figures

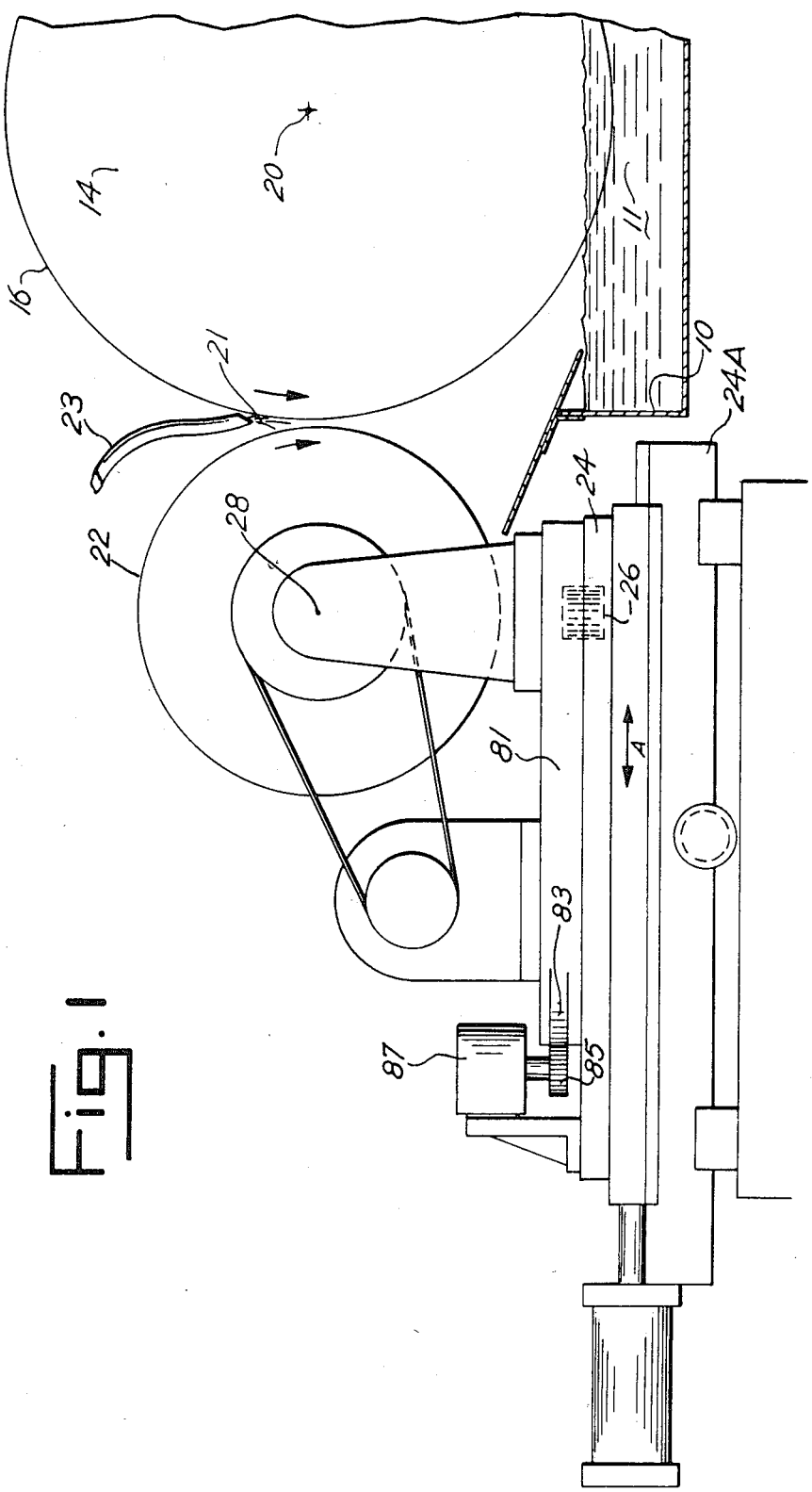

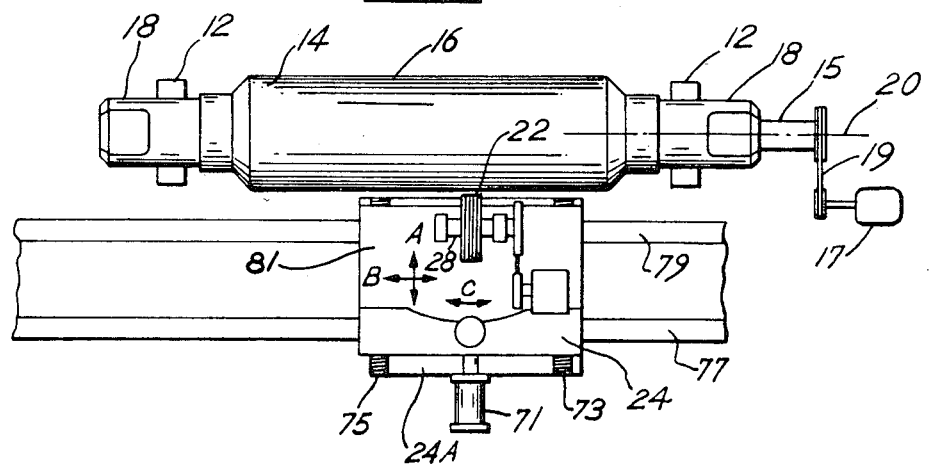
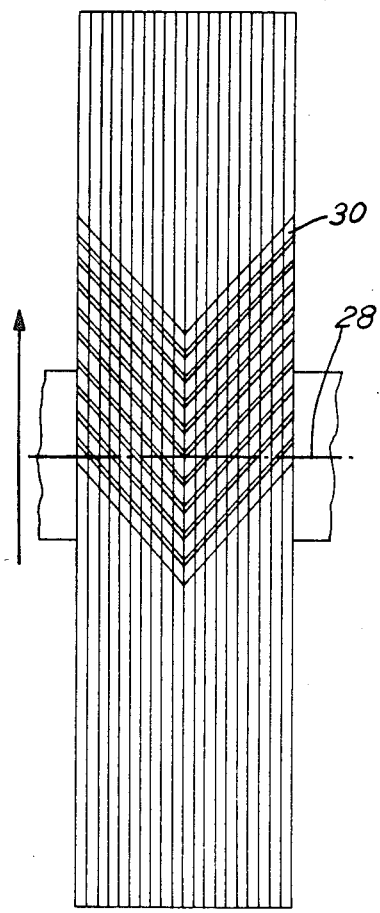
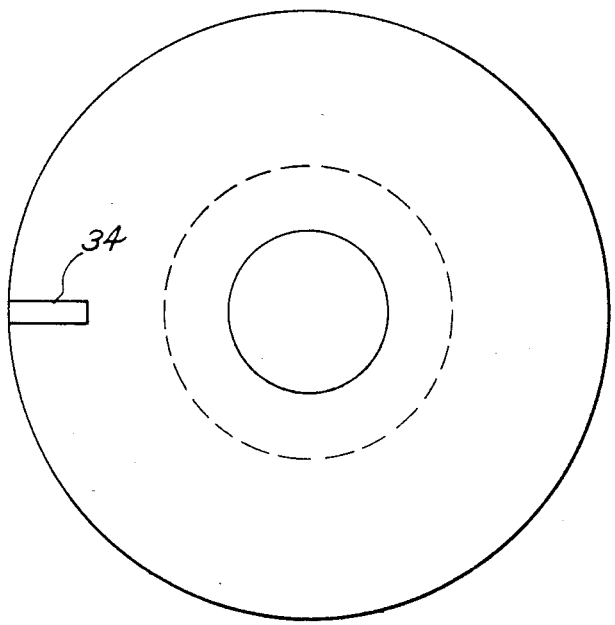

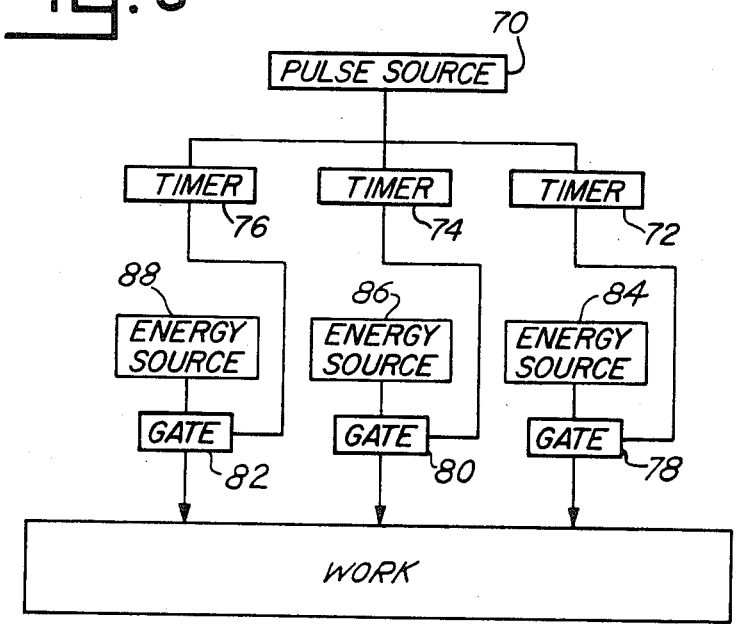
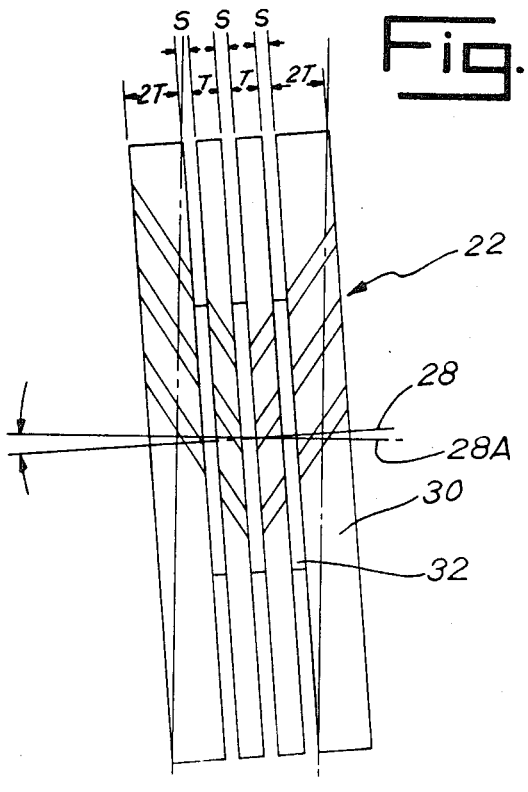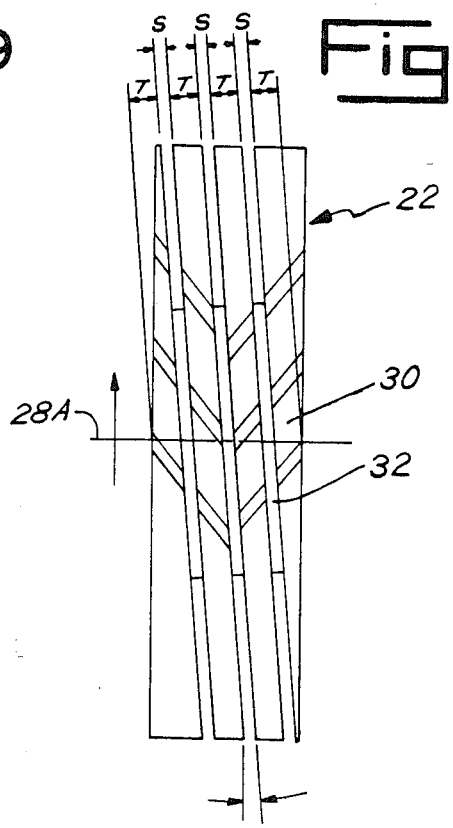

ELECTRICAL DISCHARGE SURFACE CONDITIONING DEVICE

BACKGROUND OF THE INVENTION

This invention relates to apparatus for electric discharge machining of the surface of a work roll and, more particularly, to a new electrode construction and electrode mounting arrangement for such apparatus.

The use of a satin or matte finished roll for cold rolling of steel sheet or strip in order to texture the surface of the finished product has been a practice in the steel industry for some time. One patent that discloses this practice and teaches a method for providing such a finish is Bills, et al, U.S. Pat. No. 3,754,873 issued Aug. 28, 1973 for a Cold Rolled Sheet. The Bills et al patent teaches that in order to effect a satinized or textured surface on sheet or strip material, the rolls for processing the sheet or strip are textured. Texturing of the rolls is generally effected by electric discharge machining methods. Since the issuance of U.S. Pat. No. 3,754,873, there has been a series of patents relating to electrical discharge machining of steel cold forming rolls including the following patents:

| Reg. No. | Inventor | Title | Issue Date |
| --- | --- | --- | --- |
| 3,796,851 | Pfaff, Jr. | Apparatus for Making Cylindrical Dies | 3/12/74 |
| 3,800,117 | Anderson | EDM Apparatus for Finishing Rolls | 3/26/74 |
| Re. 28,027 | Bills, et al | Cold Rolling Work Roll | 6/4/74 |
| 3,878,353 | Anderson | Method for Finishing Rolls | 4/15/75 |
| 3,890,481 | Buck | Electroerosive Process for Manufacturing Rotary Dies | 6/17/75 |
| 3,941,970 | Grow | Feed Roll and Method of Imparting A Rough Texture to the Surface Thereof | 3/2/76 |
| 3,962,557 | Buck | Waste Metal Removal in E.D.M. Machining | 6/8/76 |
| Re. 29,399 | Inoue | Servosystem for Gap Electrical Machining Processes (Especially Electroerosion) | 9/13/77 |
| 4,219,718 | Sato, et al | Process and Apparatus for Electrical Discharge Machining of Cylindrical Work | 8/26/80 |
| 4,221,952 | Sato, et al | Electric Discharge Machining Method | 9/9/80 |
| 4,233,485 | Sato, et al | Process for Electrical Discharge Machining of Cylindrical Work | 11/11/80 |
| 4,242,557 | Sato, et al | Apparatus for Electrical Discharge Machining of Cylindrical Work | 12/30/80 |
| 4,287,403 | Sato, et al | Method and apparatus for Adjusting the Gap in an Electric Discharge Machine | 9/1/81 |

It will be noted that among the patents listed, are two, No. 3,800,117 and No. 3,878,353, issued in the name of the present inventor. These patents disclose that rolls may be machined by electric discharge methods that call for mounting the roll partially submerged in a reservoir of dielectric fluid in opposed relation to a discharge electrode. The other prior art patents teach various electrode constructions, as well as various control circuitry for the electric discharge machining apparatus. Also, the various patents listed are not necessarily directed to methods for the manufacture of cold forming rolls, but, in fact, are directed to the general practice of electrical discharge machining apparatus and control equipment for such apparatus.

The present invention is particularly directed to electric discharge machining of rolls which would be used in the manufacture of sheet and strip and especially the apparatus for texturizing or for satinizing such rolls. The invention has application, however, to texturizing a long shaft such as a temper mill work roll, a short shaft such as a crankshaft, a wear surface such as a cylinder opening, and a flat surface such as a machine slide surface.

Prior art apparatus and procedures, though successful and useful, are perceived to have some shortcomings. For example, control of the uniformity of the texture or pattern applied to the surface of the roll, particularly a roll which has a curved surface, has been difficult. Control of the machining operation itself by controlling the strength, duration and location of the electric discharge pulses has also been difficult. The present invention provides an apparatus which enhances the ability to control the electric discharge to a surface, particularly a surface having a simple curved or compound curved shape.

SUMMARY OF THE INVENTION

Briefly, the present invention comprises an apparatus for electric discharge machining of the surface of a roll where that roll is of a type which is mounted for rotation about a longitudinal axis above a reservoir of dielectric fluid. The roll is positioned for cooperation with an electrode that moves over the surface of the roll as the electrode provides an electric discharge to the roll and thereby alters the condition of the surface of the roll. The electrode has a cylindrical shape and is constructed by a series of alternating wafers or discs of conductive and nonconductive material arranged as a composite stack to form the cylinder shaped electrode. Electric current is provided for flow through the conductive discs. Additionally, the conductive discs have a pattern of slots in their outside surface and are mounted for rotation about the cylinder axis which the discs define. The surface of the cylinder is positioned in opposition to the surface of the roll form being machined. As the cylindrical electrode is rotated, the dielectric fluid which is directed into the gap between the roll and the cylinder flows in the cylinder slots which cause fluid movement from the surface of the roll and thus to flush the surface of the roll which is being machined by the electrode. The rotating cylinder of discs is also mounted so that it may move transversely over the surface of the roll and in this manner may be exposed to the total surface of the roll as the roll is rotated about its longitudinal axis. A mounting arrangement for the cylindrical electrode provides three degrees of control freedom. Control circuitry is provided for controlling the orientation of the electrode surface relative to the surface of the roll being formed. Control circuitry is also provided to control electric pulse discharges from the conductive discs of the cylindrical electrode.

Thus, it is an object of the present invention to provide an improved, electrical discharge, machining apparatus.

It is a further object of the invention to provide an improved, electric discharge, machining apparatus which includes a special electric discharge, electrode assembly comprised of a plurality of alternating conductive and nonconductive discs that form a cylindrical discharge electrode.

Still a further object of the invention is to provide an electric discharge electrode fabricated from a plurality of alternating conductive and non-conductive discs with the outside surface of the discs including slots for flushing of fluid from the area of the surface being machined as the electrode is rotated in opposed relation to that surface.

Still a further object of the present invention is to provide an improved, electric discharge, machining device which includes a control mechanism for controlling electric discharge from a series of alternating conductive discs associated with and separated by non-conductive discs to form a cylindrical discharge electrode.

Another object of the invention is to provide an electric discharge apparatus having an electric discharge electrode in opposed relation to a workpiece or roll which is being machined wherein the electrode is cylindrical and is controlled in such a manner as to keep it in properly opposed relationship to the workpiece over the total surface of the workpiece as the electrode transverses that surface. The invention has application with a long, generally cylindrical shaft, a short generally cylindrical shaft, generally cylindrical openings, and a flat or slightly curved surface.

Still another object of the invention is to provide an improved and simplified electric discharge machining apparatus which provides enhanced control of the discharge machining operation.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a diagramatic elevation of the apparatus;

FIG. 2 is a plan view of the improved apparatus of FIG. 1;

FIG. 3 is an enlarged plan view of the cylindrical electrode shown in FIG. 2;

FIG. 4 is a cross sectional view of the electrode of FIG. 2;

FIG. 8 is an electrical schematic for the electric discharge control of the electrode for the apparatus of the present invention;

FIG. 9 is an enlarged plan view of an alternative cylindrical electrode configuration; and FIG. 10 is an enlarged plan view of an alternative cylindrical electrode configuration.

DESCRIPTION OF THE PREFERRED EMBODIMENT

Figure 5:
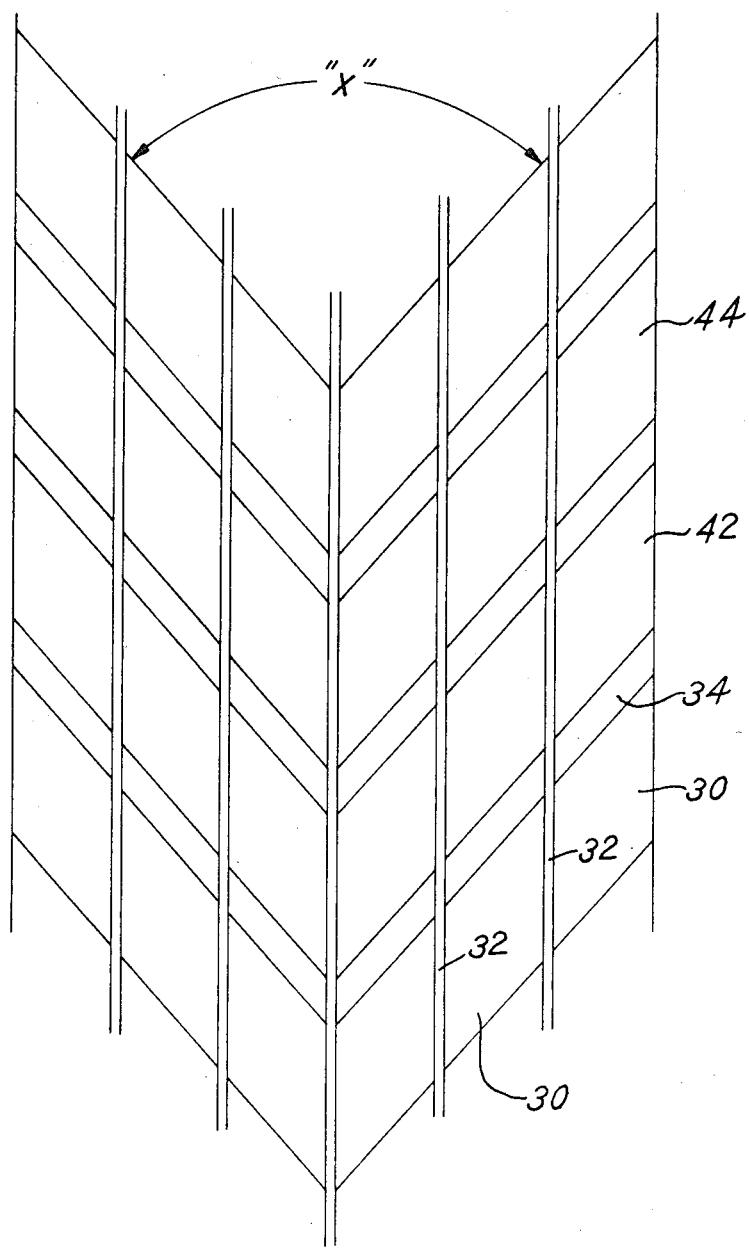
FIG. 5 is an enlarged plan view of the electrode surface associated with the apparatus of the invention.

In the following description, particular attention will be directed to the specific construction of the discharge electrode associated with the electric discharge machining apparatus as well as the means for mounting that discharge electrode and for controlling electric discharge from that electrode. The remainder of the assembly will be clear to those skilled in the art inasmuch as such equipment is available and is taught in many of the prior art references as disclosed above.

Thus, FIGS. 1 and 2 depict in a schematic view the total apparatus of the present invention. The apparatus includes a reservoir or tank 10 in which a dielectric fluid is provided as known to those skilled in the art. Mounted for rotation on the appropriate support mechanisms 12 is a roll 14 having a shaped surface 16 which is to be textured. The roll 14 includes journals 18 which ride on the support mechanisms 12 and which, during the machining operation, are connected via shaft 15 to a drive, such as a belt drive 19 driven by motor 17, so as to rotate the roll 14 at a desired speed and in a desired direction about a longitudinal axis 20 associated with the roll 14. The roll 14 is at least partly immersed in the fluid 11 in the reservoir 10 at least during part of the rotation of the roll 14 about axis 20, although the roll 14 may be supported slightly above the reservoir.

Arranged in opposed relation to the roll 14 is an electrode 22 from which current is discharged through a dielectric fluid stream 21 from tube 23. Current is directed to the surface 16 of the roll 14 in order to effectively machine and thus form the surface 16 in a desired matte or satin pattern. The electrode 22 is mounted physically on a mounting platform or assembly 24, 24A, 81 having three degrees of controlled freedom. The electrode 22 may thus move toward and away from the surface 16 (direction A). It may move in a direction (direction B) parallel to the axis 20 of the roll 14. It may pivot (direction C) about a point such as centerpoint 26 associated with the electrode 22. Centerpoint 26 lies on a vertical line which extends upward through the rotation axis 28 of the generally cylindrical electrode 22. Thus the point 26 lies on a line which is equidistant from the opposite faces of the cylindrical electrode 22.

Figure 7:
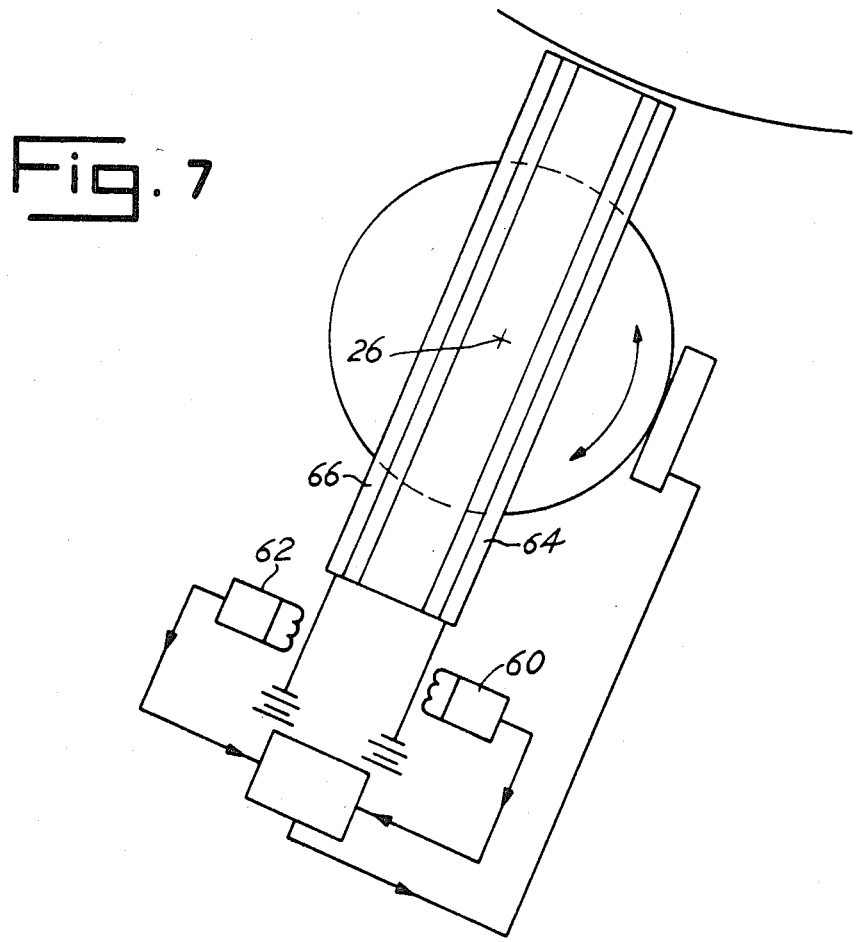
FIG. 7 is a schematic plan view of the improved apparatus of the present invention illustrating the mounting and control assembly associated with the discharge electrode.

FIGS. 3, 4, 5 and 6 illustrate in greater detail the unique construction of the electrode 22. FIGS. 7 and 8 illustrate in further detail the features associated with the construction and control of the electrode 22 and its mounting assembly 24. Referring therefore first to FIG. 3, it will be seen that the electrode 22 is generally cylindrical in shape. It is comprised of a series of alternating conductive and non-conductive discs 30, 32 respectively. The discs 30, 32 are arranged in a contact cylinder which is rotatable about axis 28. The non-conductive discs 32 extend toward the outer periphery of the cylinder and insulate the conductive discs 30 from each other. The conductive discs 30 include slots 34 which define a V-shaped or herringbone pattern in the array of conductive discs 30. The point of the V may be substantially at the transverse center plane of the cylinder 22 as shown in FIG. 3 and is directed opposite to the direction of rotation of the cylinder 22 about the axis 28. The opening angle 36 in FIG. 5 defined by the opposite sides of the V defined by the slots 34 is preferably less than 180°. Preferably the slots 34 are spaced about the outer periphery of each of the conductive discs 30 in a uniform manner although slots 34 may be varied in configuration, depth, and array on the outer surface of the cylinder 22.

Figure 6:
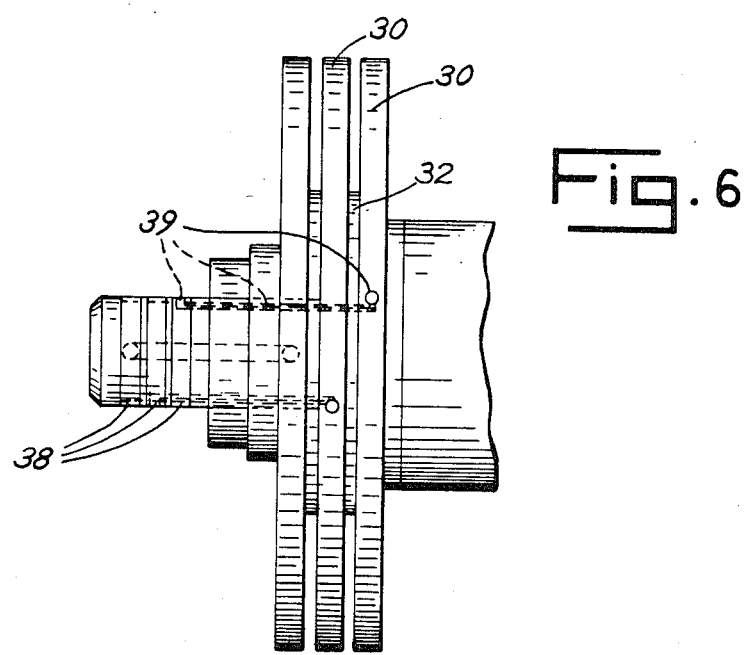
FIG. 6 is an enlarged partial plan view of the cylindrical electrode.

As shown in FIG. 6, each of the conductive discs 30 is preferably separately connected to an electrically conductive ring 38 via a connector 39. Each ring 38 connects with a power source that provides electric energy.

In operation, the electrode 22 is driven about axis 28. As the electrode 22 rotates, the channels formed by the slots 34 tend to provide a pumping action which moves the dielectric fluid away from the surface 16 particularly adjacent the gap between the electrode 22 and the roll 14. Thus, material which is machined by the electric discharge from the conductive discs 30 is quickly and easily transported away from the surface 16 to thereby improve the efficiency of the apparatus.

The angled slot 34 in the discs 30 insures that at least a portion of the conductive surface of each separate disc 30 is always in opposed relation to the workpiece 14. That is, a non-slotted part of the outside surface of the disc 30 between successive slots 34 will always be adjacent the surface of the roll 14. For example, a part of region 42 will be opposed to the surface of the roll 14 or a part of region 44 will be in opposed relation to surface 16 at all times along a line of closest approach between the cylinder 22 and roll 14. At no time will a slot 34 alone be totally opposed to surface 16 because the slot 34 is angled.

In practice, the conductive discs 30 are made from a conductive material such as brass, copper or graphite. The non-conductive discs 32 may be made from an insulating material such as Bakelite material or another insulating material. Further, it is preferred that the non-conductive discs 32 are maintained as thin as possible in order to avoid formation of gaps on the surface of the item being machined.

FIG. 7 illustrates the manner by which the rotating cylinder or electrode 22 is maintained in an efficient opposed relation to the form or work roll 14 (direction C in FIG. 2). It is a desired aspect of the invention to keep the outside periphery or surface of the electrode 22 in position generally defining a line to line contact or intersection interface with the form roll 14, it being understood that the form roll 14 will have, in all likelihood, a crown or a curved or compound curved shape. Thus, the axis 28 will be nearly parallel to axis 20, but slightly skewed to maintain proper alignment of electrode 22 relative to surface 16.

To provide such alignment, sensors 60, 62 are associated through an electric circuit with the outside conductive discs 64, 66 of the electrode 22. The voltage drop associated with the respective discs 64, 66 is sensed, compared and utilized to drive the assembly 24 26A, 81 associated with the electrode 22 to maintain that electrode 22 generally parallel to the surface of the roll 14 as depicted. Thus, the assembly 24 24A, 81 is driven to equalize the voltage drop across discs 64, 66. The specific circuitry and sensing mechanism to accomplish this will be recognized by those skilled in the art.

A specific mounting arrangement is described as follows and is depicted in FIGS. 1 and 2: As depicted in FIGS. 1 and 2, there are three independent motions which may be imparted to the platform assembly. The first motion in direction A indicated in FIG. 1 is accomplished by means of a servo controlled hydraulic cylinder 71 which moves the platform 24 along guide rails 73, 75 toward and away from the roll 14.

The second motion in direction B which is generally parallel to the axis 20 is accomplished by movement of the platform 24A on parallel guiderails 77, 79 which are cooperative with a nut and screw mechanism attached to the bottom of the platform 24A.

The third direction of motion of the electrode 22, namely the direction indicated as direction C in FIG. 2 and which was previously described with respect to FIG. 7, is accomplished by servo controlled rack and pinion as depicted in FIGS. 1 and 2. Specifically, an electrode platform 81 is mounted for rotation about the axis 26 on the platform 24. The platform 81 includes a circumferential rack or gear 83 cooperative with a pinion 85 driven by a servomotor 87. The servomotor 87 is controlled in accordance with the description previously given with respect to FIG. 7.

FIG. 8 illustrates a further feature of the invention; namely, a circuit which will sequence current pulses to the conductive discs 30. Specifically, a pulse control source 70 sends a signal simultaneously to various timers 72, 74, 76 associated respectively with separate conductive discs 30. The individual timers 72, 74, 76 delay, by a predetermined amount, the operation of associated gates 78, 80, 82 to control current flow from an energy source associated respectively therewith 84, 86, 88. It is possible with such an arrangement that each of the separate conductive discs 30, which are arranged in side by side by separate array, will be sequenced so that, for example, adjacent discs 30 sequentially receive current pulses. The particular sequencing and selection of the sequence of pulsing may be adjusted to vary the electric machining pattern by controlling the timer 72, 74, 76 settings.

FIGS. 9 and 10 illustrate alternative constructions for the electrode 22. FIG. 9 represents an electrode construction having an axis 28 which is substantially the same as the construction previously illustrated in FIGS. 6, 3 and 5. However, the construction in FIG. 9 provides that the outer disc 30 on each side of the electrode 22 has a width twice as great as the width of the discs which are the interior of the electrode.

FIG. 10 illustrates a manner in which the electrode of FIG. 9 can be modified in order to skew the relationship of the separate discs 30 with respect to the axis 28A in FIG 10. The arrangement of the electrodes shown in FIG. 10 further enables insuring a uniform textured surface to be produced. It will eliminate further non-textured strips resulting from the non-conductive spaces on the electrode.

While there has been set forth a preferred embodiment of the invention, it is to be understood that the invention is to be limited only by the following claims and their equivalents.

What is claimed is:

1. Apparatus for electric discharge machining the surface of a workpiece wherein the workpiece is mounted for rotation about a longitudinal axis for cooperation with an electrode that moves over the surface and including means for directing a dielectric fluid flow in the gap between the electrode and workpiece, said electrode providing an electric discharge therefrom to the workpiece surface to alter the surface condition into a desired form, said apparatus comprising:

an electrode including a plurality of alternating generally cylindrical discs of conductive and non-conductive material arranged in a composite stack to form a cylinder defining a face, said cylinder having an axis;

means for mounting the electrode for rotation about the axis of the cylinder, said means for mounting also including means for aligning the axis of the cylinder parallel to the workpiece axis so as to maintain the cylinder face generally parallel to an incremental workpiece surface;

means for maintaining a defined gap between the electrode and the workpiece surface, said gap being located on a line generally perpendicular to the axes and connecting the axes;

means for providing electric current for discharge to the conductive discs and for controlling the current to said discs;

means for rotating the composite stack electrode; and means for moving the composite stack of discs transversely along the axis of the workpiece.

2. The apparatus of claim 1 wherein the conductive discs include slots defined in their outer cylindrical surface and providing means for pumping fluid in the region of the gap as the electrode rotates.

3. The apparatus of claim 2 wherein the slots are straight line slots forming an acute angle with a plane transverse to the cylinder axis.

4. The apparatus of claim 2 wherein the slots are straight line slots forming a plurality of V-shaped composite slots in the surface of the cylinder electrode.

5. The apparatus of claim 1 wherein the electrode is comprised of a series of alternating substantially equal sized, conductive and non-conductive discs.

6. The apparatus of claim 1 including control means for controlling the discharge of current from each conductive disc whereby the sequence, duration or strength of current discharge for each conductive disc is separately controlled.

7. The apparatus of claim 1 wherein the means for mounting the cylinder includes means for continuously maintaining the effective surface of the cylinder at the gap parallel with the surface of the workpiece as the cylinder traverses the surface of the workpiece.

8. The apparatus of claim 1 wherein the cylindrical axis of the discs is skewed with respect to the cylindrical axis of the composite electrode.

* * * * *